United States Patent
Wu

(10) Patent No.: US 11,119,363 B2
(45) Date of Patent: Sep. 14, 2021

(54) DISPLAY PANEL, MANUFACTURING METHOD THEREFOR, AND DISPLAY DEVICE

(71) Applicant: HKC CORPORATION LIMITED, Shenzhen (CN)

(72) Inventor: Chuan Wu, Chongqing (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 17/042,118

(22) PCT Filed: Dec. 12, 2018

(86) PCT No.: PCT/CN2018/120463
§ 371 (c)(1),
(2) Date: Sep. 26, 2020

(87) PCT Pub. No.: WO2020/113627
PCT Pub. Date: Jun. 11, 2020

(65) Prior Publication Data
US 2021/0018786 A1 Jan. 21, 2021

(30) Foreign Application Priority Data

Dec. 3, 2018 (CN) .......................... 201811465881.9

(51) Int. Cl.
*G02F 1/1339* (2006.01)
*G02F 1/1337* (2006.01)

(52) U.S. Cl.
CPC .... *G02F 1/13394* (2013.01); *G02F 1/133723* (2013.01)

(58) Field of Classification Search
None
See application file for complete search history.

(56) References Cited

U.S. PATENT DOCUMENTS

2002/0051112 A1* 5/2002 Katsura ................. G02F 1/1339
349/153
2007/0121054 A1* 5/2007 Jang ....................... G02F 1/1341
349/187

(Continued)

FOREIGN PATENT DOCUMENTS

CN 101191958 A 6/2008
CN 101290417 A 10/2008

(Continued)

OTHER PUBLICATIONS

Huimin Gao, the ISA written comments, dated Aug. 2019, CN.
Huimin Gao, the International Search Report, dated Aug. 2019, CN.

*Primary Examiner* — Ryan Crockett

(57) ABSTRACT

This application discloses a display panel, a manufacturing method therefor, and a display device. The display panel is divided into an active area and a non-active area, and includes: a first substrate, a second substrate, a sealant arranged between the first substrate and the second substrate, and an alignment layer arranged on the second substrate. The non-active area of the second substrate is provided with a retaining wall structure, and the retaining wall structure is arranged between the alignment layer and the sealant. The retaining wall structure includes a trunk and a plurality of branches, where the plurality of branches are arranged at least on a side of the trunk close to the alignment layer or the sealant, and the plurality of branches are respectively away from the trunk and extend toward the alignment layer or the sealant.

20 Claims, 4 Drawing Sheets

(56) References Cited

U.S. PATENT DOCUMENTS

| | | | |
|---|---|---|---|
| 2009/0066903 A1* | 3/2009 | Yoshida | G02F 1/1339 349/153 |
| 2012/0013970 A1* | 1/2012 | Shin | G02F 1/1679 359/296 |
| 2015/0158240 A1* | 6/2015 | Haase | B29C 59/022 264/293 |
| 2017/0123244 A1* | 5/2017 | Oh | G02F 1/133345 |
| 2018/0059320 A1* | 3/2018 | Miller | G02B 25/001 |
| 2018/0196290 A1* | 7/2018 | Li | G02F 1/133308 |
| 2020/0166793 A1* | 5/2020 | Huang | G02F 1/13439 |
| 2020/0183213 A1* | 6/2020 | Wu | G02F 1/13394 |

FOREIGN PATENT DOCUMENTS

| | | |
|---|---|---|
| CN | 105204237 A | 12/2015 |
| CN | 205539852 U | 8/2016 |
| CN | 106154652 A | 11/2016 |
| CN | 106896586 A | 6/2017 |
| CN | 206601549 U | 10/2017 |

\* cited by examiner

DISPLAY PANEL, MANUFACTURING METHOD THEREFOR, AND DISPLAY DEVICE

This application claims the priority to the Chinese Patent Application No. CN201811465881.9, filed with National Intellectual Property Administration, PRC on Dec. 3, 2018 and entitled "DISPLAY PANEL, MANUFACTURING METHOD THEREFOR, AND DISPLAY DEVICE", which is incorporated herein by reference in its entirety.

TECHNICAL FIELD

This application relates to the field of display technologies, and in particular, to a display panel, a manufacturing method therefor, and a display device.

BACKGROUND

Statement herein merely provides background information related to this application and does not necessarily constitute the existing technology.

In a display panel, such as a Thin Film Transistor-Liquid Crystal Display (TFT-LCD), before liquid crystals are injected, a patterned Thin Film Transistor (TFT) substrate and a patterned Color Filter (CF) substrate are generally coated with a layer of Polyimide (PI), to generate an anchoring force on the liquid crystals and impart the liquid crystals with fixed pretilt angles.

The PI is in liquid form when coated onto the substrate, and forms a PI film after being dried. A Photo Spacer (PS) retaining wall is generally designed on the CF side to block the PI liquid to prevent the PI liquid from overlapping with the sealant to affect the curing of the sealant. However, the reflux of the PI liquid at the retaining wall may result in mura.

SUMMARY

This application provides a display panel, a manufacturing method therefor, and a display device to improve the display quality.

This application discloses a display panel. The display panel is divided into an active area and a non-active area, and includes: a first substrate; a second substrate, arranged opposite to the first substrate; and a sealant, corresponding to the non-active area, and arranged between the first substrate and the second substrate; and an alignment layer, arranged on the second substrate. The non-active area of the second substrate is provided with a retaining wall structure, and the retaining wall structure is arranged between the alignment layer and the sealant. The retaining wall structure includes a trunk and a plurality of branches. The plurality of branches are arranged at least on a side of the trunk close to the alignment layer or the sealant, and the plurality of branches are respectively away from the trunk and extend toward the alignment layer or the sealant.

Optionally, an angle between the branch and the trunk is an acute angle.

Optionally, an angle between the branch and the trunk is 45 degrees.

Optionally, the branches include first direction branches and second direction branches. An extending direction of the first direction branch is different from that of the second direction branch, and the first direction branches and the second direction branches are alternately arranged.

Optionally, an angle between the first direction branch and the trunk is θ1, an angle between the second direction branch and the trunk is θ2, and θ1 and θ2 are complementary.

Optionally, θ1 is 45 degrees and θ2 is 135 degrees.

Optionally, an angle between the first direction branch and the trunk is θ1, an angle between the second direction branch and the trunk is θ2, and θ1 and θ2 are not complementary.

Optionally, a length of the branch is y and y is greater than 2 microns and less than 200 microns.

Optionally, the second substrate includes a first retaining wall structure and a second retaining wall structure. The first retaining wall structure extends in the form of a ring and is arranged between the alignment layer and the sealant, and the second retaining wall structure extends in the form of a ring and is arranged at a periphery of the sealant. The first retaining wall structure includes a first trunk, a plurality of first branches, and a plurality of second branches. The plurality of first branches are located on a side of the first trunk close to the alignment layer and extend toward the alignment layer, and the plurality of second branches are located on a side of the first trunk close to the sealant and extend toward the sealant. The second retaining wall structure includes a second trunk, a plurality of third branches, and a plurality of fourth branches. The plurality of third branches are located on a side of the second trunk close to the sealant and extend toward the sealant, and the plurality of fourth branches are located on a side of the second trunk away from the sealant, and extend away from the sealant.

Optionally, the second substrate includes a first retaining wall structure and a second retaining wall structure. The first retaining wall structure extends in the form of a ring and is arranged between the alignment layer and the sealant, and the second retaining wall structure extends in the form of a ring and is arranged at a periphery of the sealant. The first retaining wall structure includes a first trunk and a plurality of first branches, and the plurality of first branches are located on a side of the first trunk close to the sealant and extend toward the sealant. The second retaining wall structure includes a second trunk and a plurality of second branches, and the plurality of second branches are located on a side of the second trunk close to the sealant and extend toward the sealant.

Optionally, the second substrate includes a first retaining wall structure and a second retaining wall structure. The first retaining wall structure extends in the form of a ring and is arranged between the alignment layer and the sealant, and the second retaining wall structure extends in the form of a ring and is arranged at a periphery of the sealant. The first retaining wall structure includes a first trunk and a plurality of first branches, and the plurality of first branches are located on a side of the first trunk close to the alignment layer and extend toward the alignment layer. The second retaining wall structure includes a second trunk and a plurality of second branches, and the plurality of second branches are located on a side of the second trunk close to the sealant and extend toward the sealant.

Optionally, the second substrate includes a first retaining wall structure and a second retaining wall structure. The first retaining wall structure extends in the form of a ring and is arranged between the alignment layer and the sealant, and the second retaining wall structure extends in the form of a ring and is arranged at a periphery of the sealant. The first retaining wall structure includes a first trunk, a plurality of first branches, and a plurality of second branches. The plurality of first branches are located on a side of the first trunk close to the alignment layer and extend toward the alignment layer, and the plurality of second branches are located on a side of the first trunk close to the sealant and extend toward the sealant. The second retaining wall structure includes a second trunk and a plurality of third branches, and the plurality of third branches are located on a side of the second trunk close to the sealant and extend toward the sealant.

Optionally, the first substrate is an array substrate, and the second substrate is a color filter substrate.

Optionally, the retaining wall structure is arranged on the first substrate.

Optionally, the retaining wall structure is a photo spacer.

Optionally, distances between neighboring branches are equal.

Optionally, distances between neighboring branches are not equal.

Optionally, a distance between two neighboring branches is x, and x is greater than 2 microns and less than 200 microns.

This application also discloses a method for manufacturing a display panel. The display panel is divided into an active area and a non-active area. The manufacturing method includes steps of:

forming a first substrate;
forming a retaining wall structure in a corresponding non-active area on a substrate of a second substrate;
injecting, on the substrate of the second substrate, an alignment solution to an inner side of the retaining wall structure close to the active area, to form an alignment layer and obtain the second substrate;
forming a sealant between the first substrate and the second substrate and corresponding to an outer side of the retaining wall structure; and
cell-assembling the first substrate and the second substrate to obtain a liquid crystal cell; where
the retaining wall structure includes a trunk and a plurality of branches, the plurality of branches are arranged at least on a side of the trunk close to the alignment layer or the sealant, and the plurality of branches are respectively away from the trunk and extend toward the alignment layer or the sealant.

This application also discloses a display device including the foregoing display panel.

Compared with the solution in which the retaining wall structure has only a trunk, in this application, the retaining wall structure includes a trunk and a plurality of branches. The trunk is arranged between the alignment layer and the sealant to prevent the alignment solution forming the alignment layer from overlapping with the sealant to affect the performance of the alignment layer and the sealant. In addition, the branches extend toward the alignment layer or the sealant, and divide the retaining wall into a plurality of regions to distribute the impact force, thereby achieving a good buffer effect and making the retaining wall play a good role; the branches can divert the sealant or the alignment solution forming the alignment layer when the sealant or the alignment solution hits the retaining wall, thereby reducing the possibility of the overlap of the sealant and the alignment solution after the sealant or the alignment solution excessively accumulates beyond the retaining wall structure, and improving the display quality.

BRIEF DESCRIPTION OF DRAWINGS

The drawings included are used for providing understanding of embodiments of this application, constitute part of the specification, and are used for illustrating implementation manners of this application, and interpreting principles of this application together with text description. Apparently, the accompanying drawings in the following descriptions are merely some embodiments of this application, and a person of ordinary skill in the art can also obtain other accompanying drawings according to these accompanying drawings without involving any creative effort. In the accompanying drawings.

DETAILED DESCRIPTION

Figure 1:
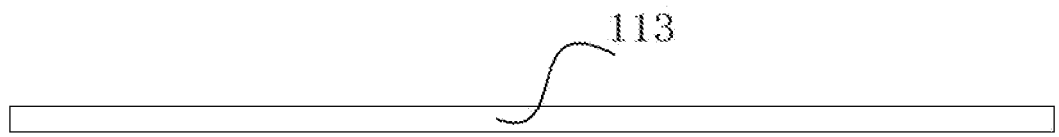
FIG. 1 is a schematic diagram of an exemplary retaining wall structure according to an embodiment of this application.

It should be understood that the terms, specific structural and functional details disclosed herein are merely representative for the purpose of describing particular embodiments. However, this application may be embodied in many alternate forms and should not be construed as being limited to the embodiments set forth herein.

In the description of this application, terms "first" and "second" are used only for description purposes, and shall not be understood as indicating relative importance or implicitly indicating a quantity of indicated technical features. Therefore, features defining "first" and "second" may include one or a plurality of the features, either explicitly or implicitly, unless otherwise indicated; and "a plurality of" means two or more. The term "include" and any variants thereof, meaning non-exclusive inclusion, may exist or add one or more other features, integers, steps, operations, units, components and/or combinations thereof.

In addition, terms indicating orientation or positional relationship such as "center", "horizontal", "upper", "lower", "left", "right", "vertical", "horizontal", "top", "bottom", "inside", "outside", are described based on the orientation or relative positional relationship shown in the drawings, only for a simplified description of this application, are not intended to indicate that the device or component referred to has a particular orientation or is constructed and operated in a particular orientation, and cannot be understood as a limitation on this application.

In addition, unless otherwise explicitly specified or defined, the terms such as "mount", "install", "connect", and "connection" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components. Persons of ordinary skill in the art may understand the specific meanings of the foregoing terms in this application according to specific situations.

Figure 2:
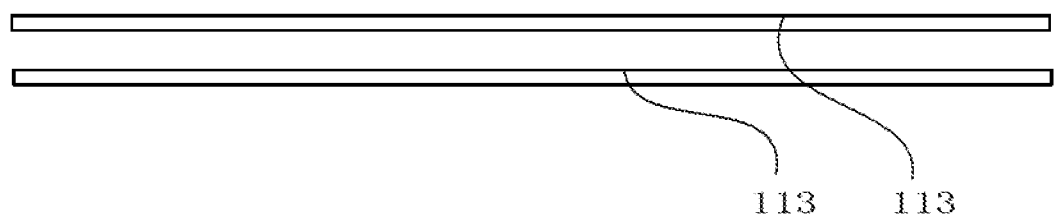
FIG. 2 is a schematic diagram of another exemplary retaining wall structure according to an embodiment of this application.
Figure 3:
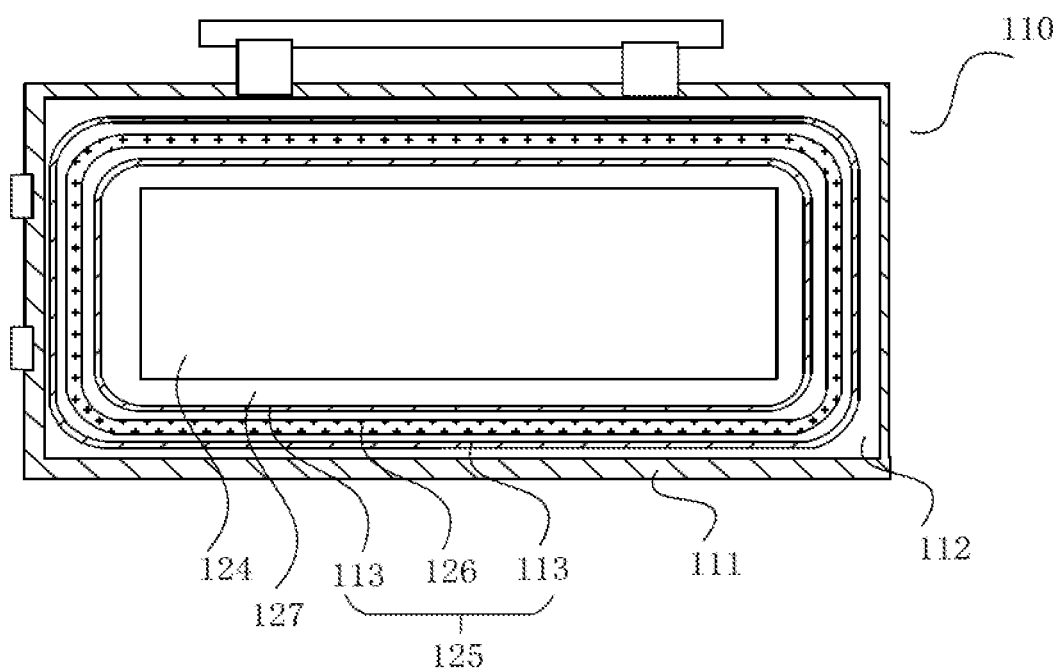
FIG. 3 is a schematic structural diagram of a display panel according to an embodiment of this application.

In a Thin Film Transistor-Liquid Crystal Display (TFT-LCD), before liquid crystals are injected, a patterned Thin Film Transistor (TFT) substrate and a patterned Color Filter (CF) substrate are generally coated with a layer of Polyimide (PI), to generate an anchoring force on the liquid crystals and impart the liquid crystals with fixed pretilt angles. The PI is in liquid form when coated onto the substrate, and forms a PI film after being dried. A Photo Spacer (PS) is generally designed on the CF side to block the PI liquid to prevent the PI liquid from overlapping with the sealant to affect the curing of the sealant. FIG. 1 and FIG. 2 show exemplary PS retaining wall designs. Such retaining walls can block the PI liquid. However, due to the excessive height of the PI retaining wall (generally about 2-5 micrometers (μm)), such a design causes some PI liquid at the retaining wall to flow back toward the Active Area (AA), leading to mura if areas close to the PI liquid include the active area. Similarly, the sealant is also in liquid form when coated onto the substrate, and the retaining wall can also prevent the diffusion of the sealant.

This application is further described below with reference to the accompanying drawings and optional embodiments.

As shown in FIG. 1 to FIG. 9, the embodiments of this application disclose a display panel 110, divided into an active area 124 and a non-active area 125. The display panel 110 includes: a first substrate 111 and a second substrate 112, the first substrate 111 being arranged opposite to the second substrate 112; a sealant 126, corresponding to the non-active area 125, and arranged between the first substrate 111 and the second substrate 112; and an alignment layer 127, arranged on the second substrate 112. The non-active area 125 of the second substrate 112 is provided with a retaining wall structure 113, and the retaining wall structure 113 is arranged between the alignment layer 127 and the sealant 126. The retaining wall structure 113 includes a trunk 114 and a plurality of branches 115. The plurality of branches 115 are arranged at least on a side of the trunk 114 close to the alignment layer 127 or the sealant 126, and the plurality of branches 115 are respectively away from the trunk 114 and extend toward the alignment layer 127 or the sealant 126.

For the solutions shown in FIG. 1 and FIG. 2, the retaining wall can block the PI liquid. Due to the excessive height of the PI retaining wall (generally about 2 μm to 51 μm), such a design causes some PI liquid at the retaining wall to flow back to the active area 124, leading to mura if areas close to the PI liquid include the active area. Similarly, the sealant 126 is also in liquid form when coated onto the substrate, and the retaining wall can also prevent the diffusion of the sealant 126. In this solution, the retaining wall structure 113 includes a trunk 114 and a plurality of branches 115. The trunk 114 is arranged between the alignment layer 127 and the sealant 126 to prevent the alignment solution forming the alignment layer 127 from overlapping with the sealant 126 to affect the performance of the alignment layer 127 and the sealant 126. In addition, the branches 115 extend toward the alignment layer 127 or the sealant 126, and divide the retaining wall into a plurality of regions to distribute the impact force, thereby achieving a good buffer effect and making the retaining wall play a good role; the branches 115 can divert the sealant 126 or the alignment solution forming the alignment layer 127 when the sealant 126 or the alignment solution hits the retaining wall, thereby reducing the possibility of the overlap of the sealant 126 and the alignment solution after the sealant 126 or the alignment solution excessively accumulates beyond the retaining wall structure 113, reducing the accumulation of the alignment solution or the sealant to pop up corresponding positions of the first substrate and the second substrate and affect the display effect, and improving the display quality.

The first substrate 111 is an array substrate, and the second substrate 112 is a color filter substrate. Certainly, the first substrate 111 may also be a color filter substrate and the second substrate 112 may also be an array substrate. The array substrate may be a Color Filter on Array (COA) substrate.

The retaining wall structure 113 may be arranged on the array substrate or the color filter substrate, or may be arranged on each of the two substrates. If the retaining wall structure 113 is arranged on each of the two substrates, the positions of the retaining wall structures may be corresponding to each other or not. If arranged corresponding to each other, the retaining wall structures on the two sides may be designed to be thin and may be implemented by using an existing film layer, thereby reducing manufacture procedures and conserving materials. Such a configuration is feasible as long as the alignment solution or the sealant 126 can be blocked to prevent the overlap of the alignment solution and the sealant 126. In addition, the retaining wall structure 113 may be a Photo Spacer (PS), a black matrix, or a separately arranged retaining wall structure 113, all of which can block the alignment solution or the sealant 126.

In one or more embodiments, distances between every two neighboring branches 115 are equal and are x, and 2 μm<x<200 μm. When x is less than 2 μm, the branches 115 are arranged densely, leading to a poor blocking effect. If x is greater than 200 μm, the branches 115 are arranged sparsely and cannot provide a shielding function, leading to a poor blocking effect. Certainly, the distances between every two neighboring branches 115 may not be equal, and in this case, the alignment solution or the sealant 126 can also be blocked.

Figure 4:
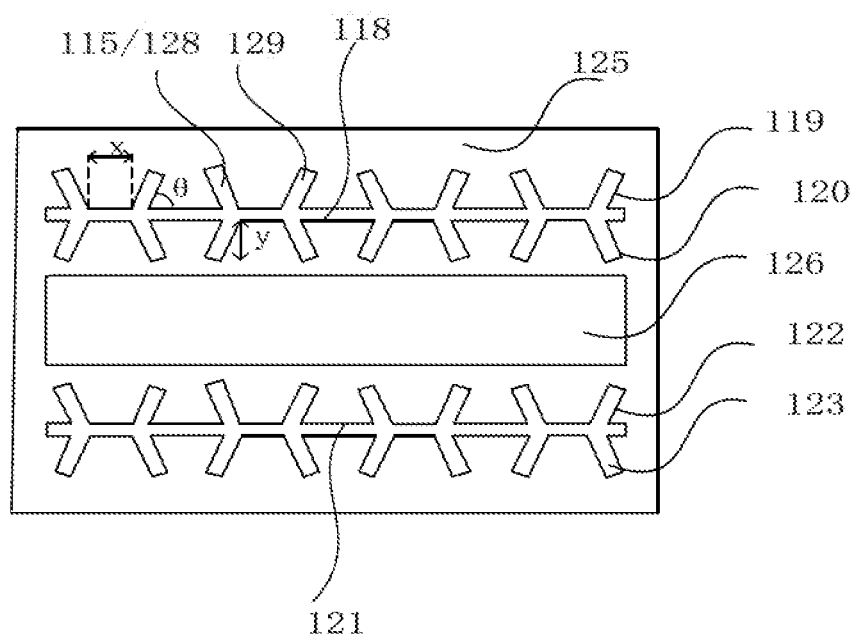
FIG. 4 is a schematic diagram (1) of a retaining wall structure according to an embodiment of this application.

As shown in FIG. 4, in one or more embodiments, an angle between the branch 115 and the trunk 114 is an acute angle. In this solution, when the branch 115 and the trunk 114 form a tilt angle, the branch 115 and the trunk 114 of the retaining wall structure 113 have a large contact area with the sealant 126 or the alignment solution that flows toward the branch 115 and the trunk 114, improving the blocking effect. Certainly, the angle between the branch 115 and the trunk 114 may not be an acute angle. For example, the angle between the branch 115 and the trunk 114 is a right angle, and in this case, the retaining wall structure has a good diversion effect while has a poor effect of preventing the reflux compared with that in the case where the angle is an acute angle.

In one or more embodiments, the branches 115 include first direction branches 128 and second direction branches 129. An extending direction of the first direction branch 128 is different from that of the second direction branch 129, and the first direction branches 128 and the second direction branches 129 are alternately arranged.

Figure 5:
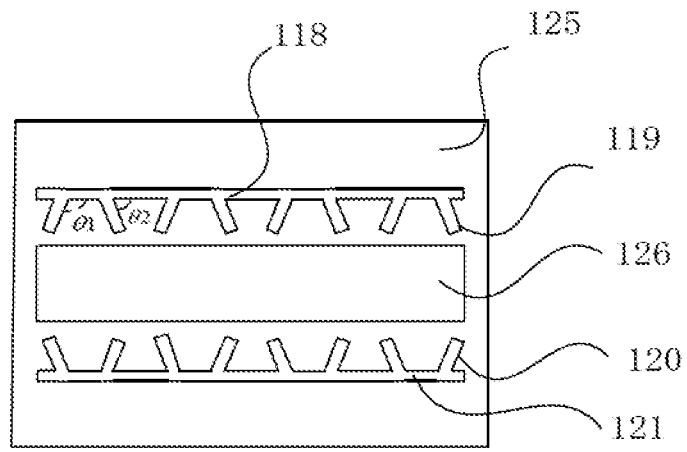
FIG. 5 is a schematic diagram (2) of a retaining wall structure according to an embodiment of this application.

As shown in FIG. 5, an angle θ1 between the first direction branch and the trunk is different from an angle θ2 between the second direction branch and the trunk. For example, θ1 may be 45 degrees, and θ2 may be 135 degrees. Certainly, θ1 and θ2 may not be complementary.

In this solution, the branches 115 include first direction branches 128 and second direction branches 129. The first direction branches 128 and the second direction branches 129 are the branches 115 on the same side, and extend in different directions. Because the alignment solution or the sealant 126 may flow in various directions, the first direction branches 115 and the second direction branches 129 extend in different directions to divert the alignment solution or the sealant 126 that flows in different directions to prevent excessive accumulation of the alignment solution or the sealant 126 in a region, so that the alignment solution or the sealant 126 that flows in different directions may be guided to different areas to make the display panel 110 uniform. Certainly, a plurality of branches 115 may extend in the same direction, for example, toward the left or right, and in this case, the overlap of the alignment solution or the sealant 126 can also be prevented.

In one or more embodiments, an angle between the branch 115 and the trunk 114 is an acute angle and is 45 degrees. In this solution, because the angle between the branch 115 and the trunk 114 is an acute angle and is 45 degrees, the contact area between the alignment solution or the sealant 126 and the branches 115 is large. The alignment solution or the sealant 126 first comes into contact with the branch when flowing toward the retaining wall structure 113. Because the angle between the branch 115 and the trunk 114 is 45 degrees, the branch blocks the alignment solution or the sealant 126 from flowing back along a certain angle to prevent the reflux of the alignment solution or the sealant 126, providing a good blocking effect. Certainly, the angle between the branch 115 and the trunk 114 may range from 5 degrees to 175 degrees.

As shown in FIG. 4, in one or more embodiments, a length of the branch 115 is y and y is greater than 2 microns and less than 200 microns. In this solution, the length of the branch 115 is y and 2 μm<y<200 μm. If y is less than 2 μm, the branch 115 cannot provide a blocking function and therefore cannot provide a buffer effect, failing to reduce the impact force of the alignment solution or the sealant 126, and failing to divert the alignment solution or the sealant 126 to prevent accumulation of the alignment solution or the sealant 126. If y is greater than 200 μm, the branch 115 occupies a large amount of space. Therefore, when the length of the branch 115 is set to be 2 μm<y<200 μm, the branch 115 can provide a good blocking effect while occupying small space.

In one or more embodiments, the quantity of retaining wall structures 113 may be one or two. The retaining wall structure 113 mentioned here includes only the trunk 114 and does not include the branches 115. When the quantity of retaining wall structures 113 is two, one of the two retaining wall structures 113 is arranged close to the active area 124, and the other is arranged at a position away from the active area 124. Compared with the solution where only one retaining wall structure 113 is arranged, in the solution where two retaining wall structures 113 are arranged, the retaining wall structure 113 close to the active area 124 can block the alignment solution flowing from the active area 124, and the retaining wall structure 113 away from the active area 124 can block the sealant 126 at the two retaining wall structures 113, thereby preventing the overlap of the alignment solution and the sealant 126.

In one or more embodiments, the quantity of retaining wall structures 113 is two. A retaining wall structure 113 close to the active area 124 is a first retaining wall, a retaining wall structure 113 away from the active area 124 is a second retaining wall, and the first retaining wall and the second retaining wall are coated with the sealant 126. The first retaining wall includes a trunk 114 and branches 115, and the second retaining wall includes only a trunk 114. Optionally, the first retaining wall includes only a trunk 114 and the second retaining wall includes a trunk 114 and branches 115, and in this case, the overlap of the alignment solution or the sealant 126 can also be prevented.

In one or more embodiments, the retaining wall structure 113 includes a trunk 114 and a plurality of branches. The trunk 114 is connected to the plurality of branches 115, and the plurality of branches 115 extend away from the trunk 114 respectively and all face toward the sealant 126. In this solution, the branches 115 all extend toward the sealant 126, to well block the sealant 126. Certainly, the branches 115 may extend toward the alignment layer 127, as long as the branches 115 can reduce the impact force of the alignment solution or the sealant 126.

In one or more embodiments, the retaining wall structure 113 includes a trunk 114 and a plurality of branches 115. The plurality of branches 115 are arranged on one side of the trunk 114. Certainly, the plurality of branches 115 may be arranged on each of two sides of the trunk 114. Compared with the solution in which the plurality of branches 115 are arranged on only one side of the trunk 114, in the solution in which the plurality of branches 115 may be arranged on each of the two sides of the trunk 114, the branches 115 on the two sides can block the alignment solution or the sealant 126 on the two sides, thereby more effectively preventing the overlap of the alignment solution and the sealant 126.

As shown in FIG. 4, in one or more embodiments, the second substrate 112 includes a first retaining wall structure 116 and a second retaining wall structure 117. The first retaining wall structure 116 extends in the form of a ring and is arranged between the alignment layer 127 and the sealant 126, and the second retaining wall structure 117 extends in the form of a ring and is arranged at a periphery of the sealant 126. The first retaining wall structure 116 includes a first trunk 118, a plurality of first branches 119, and a plurality of second branches 120. The plurality of first branches 119 are located on a side of the first trunk 118 close to the alignment layer 127 and extend toward the alignment layer 127. The plurality of second branches 120 are located on a side of the first trunk 118 close to the sealant 126 and extend toward the sealant 126. The second retaining wall structure 117 includes a second trunk 121, a plurality of third branches 122, and a plurality of fourth branches 123. The plurality of third branches 122 are located on a side of the second trunk 121 close to the sealant 126 and extend toward the sealant 126. The plurality of fourth branches 123 are located on a side of the second trunk 121 away from the sealant 126, and extend away from the sealant 126.

In this solution, the first retaining wall structure 116 includes a first trunk 118, first branches 119, and second branches 120. The first branches 119 are arranged on a side of the first trunk 118 close to the alignment layer 127. The plurality of first branches 119 divide the first trunk 118 into a plurality of areas, thereby preventing the alignment solution from flowing to a certain area and excessively accumulating to affect the display effect. In addition, the alignment solution first comes into contact with the first branches 119 when flowing toward the first trunk 118. The first branches 119 provides a buffer function to reduce the impact force of the alignment solution on the first trunk 118. The second branches 120 are arranged on a side of the first trunk 118 close to the sealant 126. The second branches 120 also function to reduce the impact force of the sealant 126. The first branches 119 and the second branches 120 of the first trunk 118 reduce the impact force of the alignment solution or the sealant 126, thereby making the entire first retaining wall structure 116 more stable, and reducing the possibility of the overlap of the sealant 126 and the alignment solution after the sealant 126 or the alignment solution excessively accumulates beyond the retaining wall structure 113. The third branches 122 are arranged on a side of the second trunk 121 close to the sealant 126. The fourth branches 123 are arranged on a side of the second trunk 121 away from the sealant 126. The third branches 122 reduce the impact force of the sealant 126 on the second trunk 121, and the fourth branches 123 reinforce the first trunk 118.

As shown in FIG. 5, in one or more embodiments, the second substrate 112 includes a first retaining wall structure 116 and a second retaining wall structure 117. The first retaining wall structure 116 extends in the form of a ring and is arranged between the alignment layer 127 and the sealant 126, and the second retaining wall structure 117 extends in the form of a ring and is arranged at a periphery of the sealant 126. The first retaining wall structure 116 includes a first trunk 118 and a plurality of first branches 119, and the plurality of first branches 119 are located on a side of the first trunk 118 close to the sealant 126 and extend toward the sealant 126. The second retaining wall structure 117 includes a second trunk 121 and a plurality of second branches 120, and the plurality of second branches 120 are located on a side of the second trunk 121 close to the sealant 126 and extend toward the sealant 126.

In this solution, the first branches 119 are arranged on the side of the first trunk 118 close to the sealant 126, and the first branches 119 divide the first trunk 118 into a plurality of areas. Because the first branches 119 extend toward the sealant 126, the sealant 126 first comes into contact with the first branches 119 when flowing toward the first trunk 118, and the first branches 119 function to provide a buffer function to reduce the force on the first trunk 118, thereby reducing the impact force of the sealant 126 on the first trunk 118. In addition, the plurality of areas can also distribute the impact force, improving the buffer effect. The second branches 120 are arranged on the side of the second trunk 121 close to the sealant 126, and the second branches 120 divide the first trunk 118 into a plurality of areas. Because the second branches 120 extend toward the sealant 126, the sealant 126 first comes into contact with the second branches 120 when flowing toward the second trunk 121, and the second branches 120 function to reduce the force on the second trunk 121, thereby reducing the impact force of the alignment solution on the first trunk 118. In addition, the plurality of areas can also distribute the impact force, improving the buffer effect. The first branches 119 and the second branches 120 respectively reduce the impact forces of the sealant 126 on the first trunk 118, thereby making the entire retaining wall structure 113 more stable.

Figure 6:
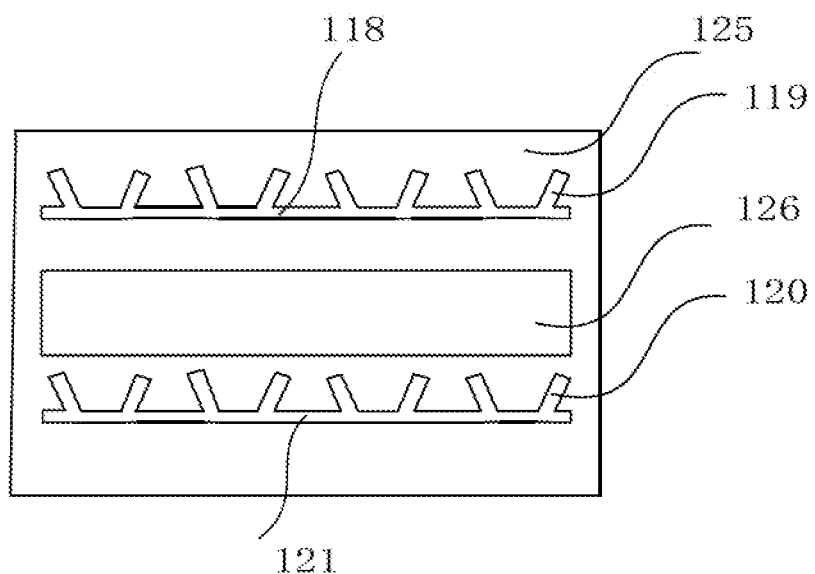
FIG. 6 is a schematic diagram (3) of a retaining wall structure according to an embodiment of this application.

As shown in FIG. 6, in one or more embodiments, the second substrate 112 includes a first retaining wall structure 116 and a second retaining wall structure 117. The first retaining wall structure 116 extends in the form of a ring and is arranged between the alignment layer 127 and the sealant 126, and the second retaining wall structure 117 extends in the form of a ring and is arranged at a periphery of the sealant 126. The first retaining wall structure 116 includes a first trunk 118 and a plurality of first branches 119, and the plurality of first branches 119 are located on a side of the first trunk 118 close to the alignment layer 127 and extend toward the alignment layer 127. The second retaining wall structure 117 includes a second trunk 121 and a plurality of second branches 120, and the plurality of second branches 120 are located on a side of the second trunk 121 close to the sealant 126 and extend toward the sealant 126.

In this solution, the first branches 119 are arranged on the side of the first trunk 118 close to the alignment layer 127, and the first branches 119 divide the first trunk 118 into a plurality of areas. Because the first branches 119 extend toward the alignment layer 127, the alignment solution first comes into contact with the first branches 119 when flowing toward the first trunk 118, and the first branches 119 functions to provide a buffer function to reduce the force on the first trunk 118, thereby reducing the impact force of the alignment solution on the first trunk 118. In addition, the plurality of areas can also distribute the impact force, improving the buffer effect. The second branches 120 are arranged on the side of the second trunk 121 close to the sealant 126, and the second branches 120 divide the first trunk 118 into a plurality of areas. Because the second branches 120 extend toward the sealant 126 and the sealant 126 first comes into contact with the second branches 120 when flowing toward the second trunk 121, the second branches 120 function to reduce the force on the second trunk 121, thereby reducing the impact force of the alignment solution on the first trunk 118. In addition, the plurality of areas can also distribute the impact force, improving the buffer effect. The first branches 119 and the second branches 120 respectively reduce the impact forces of the sealant 126 on the first trunk 118, thereby making the entire first retaining wall 113 more stable. The first retaining wall structure 116 blocks the alignment solution and the second retaining wall structure 117 blocks the alignment solution.

Figure 7:
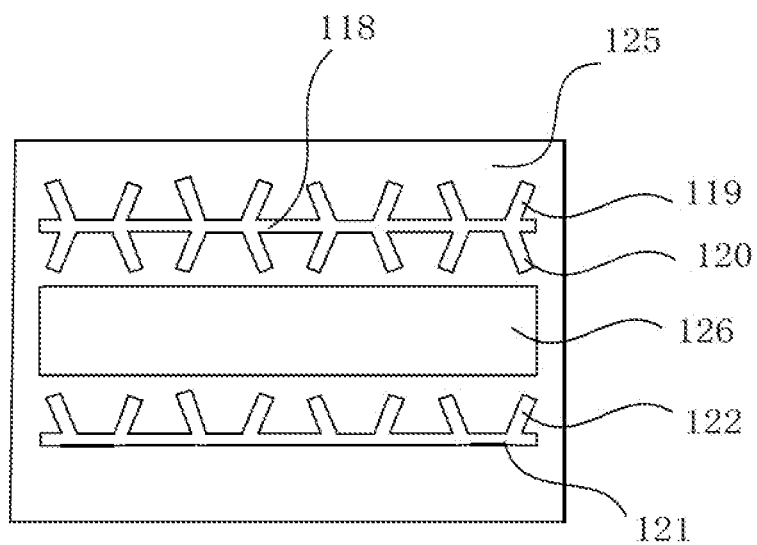
FIG. 7 is a schematic diagram (4) of a retaining wall structure according to an embodiment of this application.

As shown in FIG. 7, in one or more embodiments, the second substrate 112 includes a first retaining wall structure 116 and a second retaining wall structure 117. The first retaining wall structure 116 extends in the form of a ring and is arranged between the alignment layer 127 and the sealant 126, and the second retaining wall structure 117 extends in the form of a ring and is arranged at a periphery of the sealant 126. The first retaining wall structure 116 includes a first trunk 118, a plurality of first branches 119 and a plurality of second branches 120. The plurality of first branches 119 are located on a side of the first trunk 118 close to the alignment layer 127 and extend toward the alignment layer 127, and the plurality of second branches 120 are located on a side of the first trunk 118 close to the sealant 126 and extend toward the sealant 126. The second retaining wall structure 117 includes a second trunk 121 and a plurality of third branches 122, and the plurality of third branches 122 are located on a side of the second trunk 121 close to the sealant 126 and extend toward the sealant 126.

In this solution, the first branches 119 are arranged on the side of the first trunk 118 close to the alignment layer 127, and the first branches 119 divide the first trunk 118 into a plurality of areas. Because the first branches 119 extend toward the alignment layer 127, the alignment solution first comes into contact with the first branches 119 when flowing toward the first trunk 118, and the first branches 119 functions to provide a buffer function to reduce the force on the first trunk 118, thereby reducing the impact force of the alignment solution on the first trunk 118. In addition, the plurality of areas can also distribute the impact force, improving the buffer effect. The second branches 120 are arranged on the side of the first trunk 118 close to the sealant 126, and the second branches 120 divide the first trunk 118 into a plurality of areas. Because the first branches 119 extend toward the sealant 126, the sealant 126 first comes into contact with the second branches 120 when flowing toward the first trunk 118, and the second branches 120 function to reduce the impact force of the alignment solution on the first trunk 118. In addition, the plurality of areas can also distribute the impact force, improving the buffer effect. Both the first branches 119 and the second branches 120 reduce the impact force of the alignment solution or the sealant 126 on the first trunk 118, thereby making the entire first retaining wall more stable. The third branches 122 are arranged on the side of the second trunk 121 close to the sealant 126, and the third branches 122 divide the second trunk 121 into a plurality of areas. Because the third branches 122 extend toward the alignment layer 127, the alignment solution first comes into contact with the third branches 122 when flowing toward the second trunk 121, and the third branches 122 functions to provide a buffer function to reduce the force on the second trunk 121, thereby reducing the impact force of the alignment solution on the second trunk 121. In addition, the plurality of areas can also distribute the impact force, improving the buffer effect. The third branches 122 also prevent the sealant 126 from overflowing out of the display panel 110.

Figure 8:
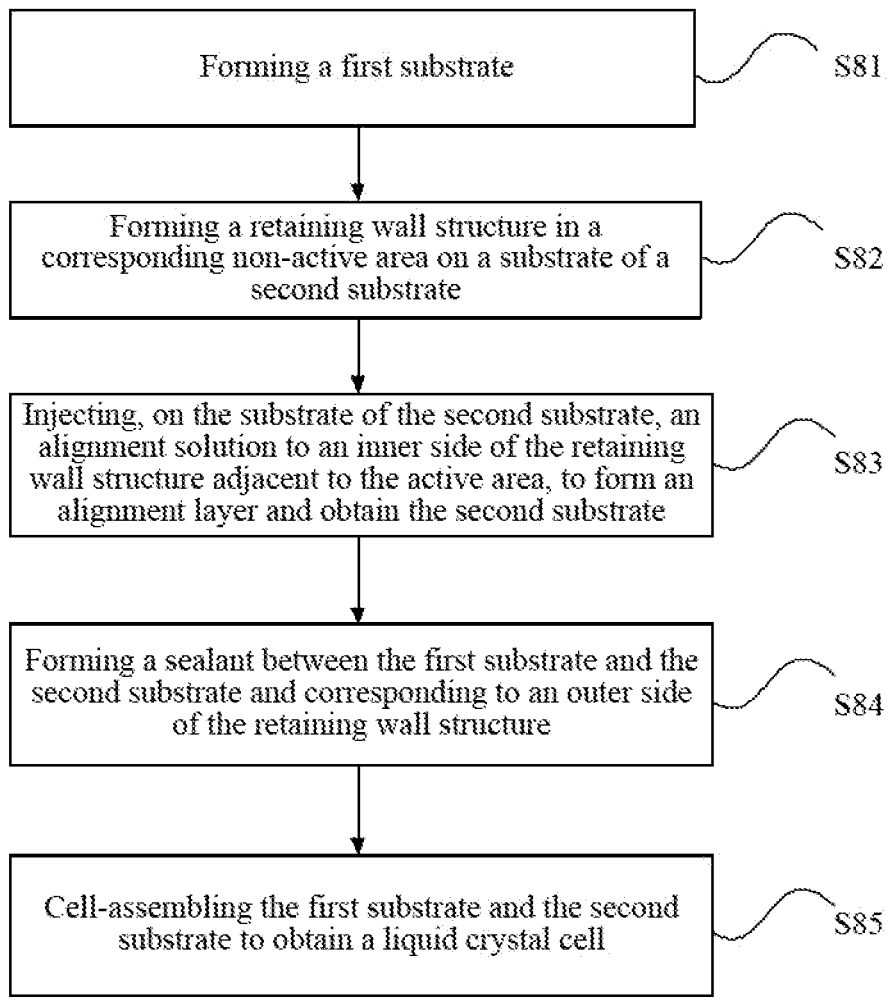
FIG. 8 is a schematic flowchart of a method for manufacturing a display panel according to an embodiment of this application

As shown in FIG. 8, in one or more embodiments of this application, a method for manufacturing a display panel 110 is disclosed. The display panel 110 is divided into an active area 124 and a non-active area 125. The manufacturing method includes steps of:

S81: forming a first substrate 111;

S82: forming a retaining wall structure 113 in the corresponding non-active area 125 on a substrate of a second substrate 112;

S83: injecting, on the substrate of the second substrate 112, an alignment solution to an inner side of the retaining wall structure 113 close to the active area 124, to form an alignment layer 127 and obtain the second substrate 112;

S84: forming a sealant 126 between the first substrate 111 and the second substrate 112 and corresponding to an outer side of the retaining wall structure 113; and S85: cell-assembling the first substrate 111 and the second substrate 112 to obtain a liquid crystal cell.

The retaining wall structure 113 includes a trunk 114 and a plurality of branches 115. The plurality of branches 115 are arranged at least on a side of the trunk 114 close to the alignment layer 127 or the sealant 126, and the plurality of branches 115 are respectively away from the trunk 114 and extend toward the alignment layer 127 or the sealant 126.

The retaining wall structure 113 of this application includes a trunk 114 and a plurality of branches 115. The trunk 114 is arranged between the alignment layer 127 and the sealant 126 to prevent the alignment solution forming the alignment layer 127 from overlapping with the sealant 126 to affect the performance of the alignment layer 127 and the sealant 126. In addition, the branches 115 extend toward the alignment layer 127 or the sealant 126, and divide the retaining wall into a plurality of regions to distribute the impact force, thereby achieving a good buffer effect and making the retaining wall play a good role; the branches 115 can divert the sealant 126 or the alignment solution forming the alignment layer 127 when the sealant 126 or the alignment solution hits the retaining wall, thereby reducing the possibility of the overlap of the sealant 126 and the alignment solution after the sealant 126 or the alignment solution excessively accumulates beyond the retaining wall structure 113, and improving the display quality.

Figure 9:
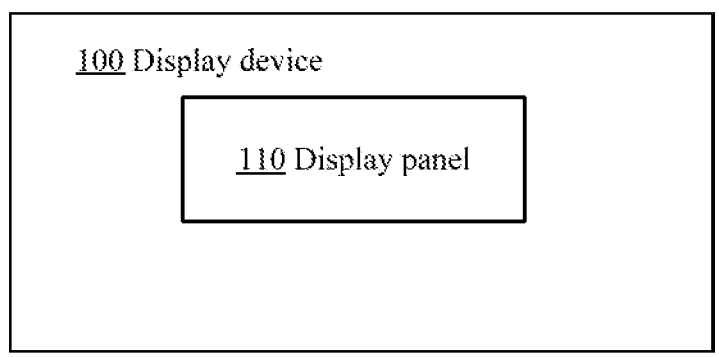
FIG. 9 is a schematic diagram of a display device according to an embodiment of this application.

As shown in FIG. 9, in one or more embodiments of this application, a display device 100 including the foregoing display panel 110 is disclosed.

This application also discloses a display panel 110. The display panel 110 is divided into an active area 124 and a non-active area 125, and includes: a first substrate 111 and a second substrate 112, the first substrate 111 being arranged opposite to the second substrate 112: a sealant 126, corresponding to the non-active area 125, and arranged between the first substrate 111 and the second substrate 112; an alignment layer 127, arranged on the second substrate 112. The non-active area 125 of the second substrate 112 is provided with a retaining wall structure 113. The retaining wall structure 113 includes a first retaining wall structure 116 and a second retaining wall structure 117. The first retaining wall structure 116 extends in the form of a ring and is arranged between the alignment layer 127 and the sealant 126, and the second retaining wall structure 117 extends in the form of a ring and is arranged at a periphery of the sealant 126. The first retaining wall structure 116 includes a first trunk 118, a plurality of first branches 119, and a plurality of second branches 120. The plurality of first branches 119 are located on a side of the first trunk 118 close to the alignment layer 127 and extend toward the alignment layer 127 by a length y. Two neighboring sub-branches 115 of the first branches 119 have different extending directions and a distance between two neighboring branches 115 is x. The plurality of second branches 120 are located on a side of the first trunk 118 close to the sealant 126 and extend toward the sealant 126. An angle between the first branch 119 and the first trunk 118 is 45 degrees or 135 degrees. The second retaining wall structure 117 includes a second trunk 121, a plurality of third branches 122, and a plurality of fourth branches 123. The plurality of third branches 122 are located on a side of the second trunk 121 close to the sealant 126 and extend toward the sealant 126. The plurality of fourth branches 123 are located on a side of the second trunk 121 away from the sealant 126, and extend away from the sealant 126.

The retaining wall structure 113 of this solution includes a trunk 114 and a plurality of branches 115. The trunk 114 is arranged between the alignment layer 127 and the sealant 126 to prevent the alignment solution forming the alignment layer 127 from overlapping with the sealant 126 to affect the performance of the alignment layer 127 and the sealant 126. In addition, the branches 115 extend toward the alignment layer 127 or the sealant 126, and divide the retaining wall into a plurality of regions to distribute the impact force, thereby achieving a good buffer effect and making the retaining wall play a good role; the branches 115 can divert the sealant 126 or the alignment solution forming the alignment layer 127 when the sealant 126 or the alignment solution hits the retaining wall, thereby reducing the possibility of the overlap of the sealant 126 and the alignment solution after the sealant 126 or the alignment solution excessively accumulates beyond the retaining wall structure 113, and improving the display quality. In addition, the angle between the branch 115 and the trunk 114 is 45 degrees or 135 degrees, thereby preventing the reflux and improving the display quality.

It should be noted that on the premise of not affecting the implementation of specific solutions, the descriptions of the steps in this application shall not be construed as limiting the execution order of the steps. A step mentioned earlier that another step may be executed before, after, or concurrently with the another step. Such execution orders shall all fall within the scope of this application as long as this application can be implemented.

The technical solution of this application can be widely applied to various display panels, such as a Twisted Nematic (TN) display panel, an In-plane Switching (IPS) display panel, a Vertical Alignment (VA) display panel, and a Multi-domain Vertical Alignment (MVA) display panel. Certainly, other types of display panels, such as an Organic Light-emitting Diode (OLED) display panel, can also be applied to the foregoing solutions.

The foregoing contents are detailed descriptions of this application in conjunction with specific and optional embodiments, and it should not be considered that the specific implementation of this application is limited to these descriptions. Persons of ordinary skill in the art can further make simple deductions or replacements without departing from the concept of this application, and such deductions or replacements should all be considered as falling within the protection scope of this application.

What is claimed is:

1. A display panel, divided into an active area and a non-active area, and comprising:
   a first substrate;
   a second substrate, arranged opposite to the first substrate;
   a sealant, corresponding to the non-active area, and arranged between the first substrate and the second substrate: and
   an alignment layer, arranged on the second substrate, wherein
   the non-active area of the second substrate is provided with a retaining wall structure, and the retaining wall structure is arranged between the alignment layer and the sealant; and
   the retaining wall structure comprises a trunk and a plurality of branches, the plurality of branches are arranged at least on a side of the trunk close to the alignment layer or the sealant, and the plurality of branches are respectively away from the trunk and extend toward the alignment layer or the sealant, wherein the trunk is arranged between the alignment layer and the sealant to prevent an alignment solution used to form the alignment layer from overlapping with the sealant, and the plurality of branches extend toward the alignment layer or the sealant and divide the retaining wall into a plurality of regions, and are operative to distribute an impact force of the alignment solution or the sealant, divert the sealant or the alignment solution when the sealant or the alignment solution hits the retaining wall to reduce the possibility of overlap of the sealant and the alignment solution due to excessive accumulation of the sealant or the alignment solution to go beyond the retaining wall structure, and reduce an accumulation of the alignment solution or the sealant to pop up corresponding positions of the first substrate and the second substrate;
   wherein a length of the branch is y and y is greater than 2 microns and less than 200 microns.

2. The display panel according to claim 1, wherein an angle between the branch and the think is an acute angle.

3. The display panel according to claim 2, wherein an angle between the branch and the think is 45 degrees.

4. The display panel according to claim 1, wherein the branches comprise first direction branches and second direction branches; and
   an extending direction of the first direction branch is different from that of the second direction branch, and the first direction branches and the second direction branches are alternately arranged.

5. The display panel according to claim 4, wherein an angle between the first direction branch and the trunk is $\theta_1$, an angle between the second direction branch and the trunk is $\theta_2$, and $\theta_1$ and $\theta_2$ are complementary.

6. The display panel according to claim 5, wherein $\theta_1$ is 45 degrees and $\theta_2$ is 135 degrees.

7. The display panel according to claim 4, wherein an angle between the first direction branch and the trunk is $\theta_1$, an angle between the second direction branch and the trunk is $\theta_2$, and $\theta_1$ and $\theta_2$ are not complementary.

8. The display panel according to claim 1, wherein the second substrate comprises a first retaining wall structure and a second retaining wall structure, the first retaining wall structure extends in the form of a ring and is arranged between the alignment layer and the sealant, and the second retaining wall structure extends in the form of a ring and is arranged at a periphery of the sealant;
   the first retaining wall structure comprises a first trunk, a plurality of first branches, and a plurality of second branches;
   the plurality of first branches are located on a side of the first trunk close to the alignment layer and extend toward the alignment layer;
   the plurality of second branches are located on a side of the first trunk close to the sealant and extend toward the sealant;
   the second retaining wall structure comprises a second trunk, a plurality of third branches, and a plurality of fourth branches;
   the plurality of third branches are located on a side of the second trunk close to the sealant and extend toward the sealant; and
   the plurality of fourth branches are located on a side of the second trunk away from the sealant, and extend away from the sealant.

9. The display panel according to claim 1, wherein the second substrate comprises a first retaining wall structure and a second retaining wall structure, the first retaining wall structure extends in the form of a ring and is arranged between the alignment layer and the sealant, and the second retaining wall structure extends in the form of a ring and is arranged at a periphery of the sealant:
   the first retaining wall structure comprises a first trunk and a plurality of first branches, and the plurality of first branches are located on a side of the first trunk close to the sealant and extend toward the sealant; and
   the second retaining wall structure comprises a second trunk and a plurality of second branches, and the plurality of second branches are located on a side of the second trunk close to the sealant and extend toward the sealant.

10. The display panel according to claim 1, wherein the second substrate comprises a first retaining wall structure and a second retaining wall structure, the first retaining wall structure extends in the form of a ring and is arranged between the alignment layer and the sealant, and the second retaining wall structure extends in the form of a ring and is arranged at a periphery of the sealant:
    the first retaining wall stricture comprises a first trunk and a plurality of first branches, and the plurality of first branches are located on a side of the first trunk close to the alignment layer and extend toward the alignment layer; and
    the second retaining wall structure comprises a second trunk and a plurality of second brandies, and the plurality of second branches are located on a side of the second trunk close to the sealant and extend toward the sealant.

11. The display panel according to claim 1, wherein the second substrate comprises a first retaining wall structure and a second retaining wall structure, the first retaining wall structure extends in the form of a ring and is arranged between the alignment layer and the sealant, and the second retaining wall structure extends in the form of a ring and is arranged at a periphery of the sealant:

the first retaining wall structure comprises a first trunk, a plurality of first branches, and a plurality of second branches; the plurality of first branches are located on a side of the first trunk. close to the alignment layer and extend toward the alignment layer;

the plurality of second branches are located on a side of the first trunk close to the sealant and extend toward the sealant: and the second retaining wall structure comprises a second trunk and a plurality of third branches, and the plurality of third branches are located on a side of the second trunk close to the sealant and extend toward the sealant.

12. The display panel according to claim 1, wherein the first substrate is an array substrate, and the second substrate is a color filter substrate.

13. The display panel according to claim 1, wherein the retaining wall structure is arranged on the first substrate.

14. The display panel according to claim 1, wherein the retaining wall structure is a photo spacer.

15. The display panel according to claim 1, wherein distances between neighboring branches are equal.

16. The display panel according to claim 1, wherein distances between neighboring branches are not equal.

17. The display panel according to claim 1, wherein a distance between two neighboring branches is x, and x is greater than 2 microns and less than 200 microns.

18. The display panel according to claim 1, wherein the second substrate comprises a first retaining wall structure and a second retaining wall structure, the first retaining wall structure extends in the form of a ring and is arranged between the alignment layer and the sealant, and the second retaining wall structure extends in the form of a ring and is arranged at a periphery of the sealant;

wherein the first retaining wall structure comprises a first trunk and a plurality of first branches, and the second retaining wall structure comprises a second trunk, wherein the plurality of first branches are disposed on at least one side of the first truck and the first branches that are disposed on each side of the first truck extend out from the first trunk at the side of the first trunk; or wherein the first retaining wall structure comprises a first trunk, and the second retaining wall structure comprises a second trunk and a plurality of second branches, wherein the plurality of second branches are disposed on at least one side of the second trunk and the second branches that are disposed on each side of the second trunk extend out from the second trunk at the side the second trunk.

19. A method for manufacturing a display panel, the display panel being divided into an active area and a non-active area, the method comprising steps of:

forming a first substrate;

forming a retaining wall structure in a corresponding non-active area on a substrate of a second substrate;

injecting, on the substrate of the second substrate, an aliment solution to an inner side of the retaining wall structure close to the active area, to form an alignment layer and obtain the second substrate;

forming a sealant between the first substrate and the second substrate and corresponding to an outer side of the retaining wall structure; and cell-assembling the first substrate and the second substrate to obtain a liquid crystal cell, wherein the retaining wall structure comprises a trunk and a plurality of branches, the plurality of branches are arranged at least on a side of the trunk close to the alignment layer or the sealant, and the plurality of branches are respectively away from the trunk and extend toward the alignment layer or the sealant, wherein the trunk is arranged between the alignment layer and the sealant to prevent the alignment solution from overlapping with the sealant, and the plurality of branches extend toward the alignment layer or the sealant and divide the retaining wall into a plurality of regions, and are operative to distribute an impact force of the alignment solution or the sealant, divert the sealant or the alignment solution when the sealant or the alignment solution hits the retaining wall to reduce the possibility of overlap of the sealant and the alignment solution due to excessive accumulation of the sealant or the alignment solution to go beyond retaining wall structure, and reduce an accumulation of the alignment solution or the sealant to pop up corresponding positions of the first substrate and the second substrate;

wherein a length of the branch is y and y is greater than 2 microns and less than 200 microns.

20. A display device comprising a display panel, the display panel comprising:

a first substrate;

a second substrate, arranged opposite to the first substrate; and a sealant, corresponding to a non-active area, and arranged between the first substrate and the second substrate; and an alignment layer, arranged on the second substrate, wherein the non-active area of the second substrate is provided with a retaining wall structure, and the retaining wall structure is arranged between the alignment layer and the sealant; and the retaining wall structure comprises a trunk and a plurality of branches, the plurality of branches are arranged at least on a side of the trunk close to the alignment layer or the sealant, and the plurality of branches are respectively away from the trunk and extend toward the alignment layer or the sealant, wherein the trunk is arranged between the alignment layer and the sealant to prevent an alignment solution used to form the alignment layer from overlapping with the sealant, and the plurality of branches extend toward the alignment layer or the sealant and divide the retaining wall into a plurality of regions, and are operative to distribute an impact force of the alignment solution or the sealant, divert the sealant or the alignment solution when the sealant or the alignment solution hits the retaining wall to reduce the possibility of overlap of the sealant and the alignment solution due to excessive accumulation of the sealant or the alignment solution to go beyond the retaining wall structure, and reduce an accumulation of the alignment solution or the sealant to pop up corresponding positions of the first substrate and the second substrate;

wherein a length of the branch is y and y is greater than 2 microns and less than 200 microns.

* * * * *